United States Patent Office 3,432,655
Patented Mar. 11, 1969

3,432,655
METHOD FOR VAPORIZING ELEMENTS BY IGNITING A MIXTURE INCLUDING THE ELEMENT
Alexis A. Venghiattis, Weston, Conn., assignor to The Perkin-Elmer Corporation, Norwalk, Conn., a corporation of New York
No Drawing. Filed July 19, 1966, Ser. No. 566,244
U.S. Cl. 250—43.5                           11 Claims
Int. Cl. G01n 21/26

This invention relates to a technique for causing an analytical sample to be transformed into the necessary state for analysis. It is particularly adapted to transform metallic components into condition for analysis by means of atomic absorption spectroscopy.

Since the technique of the invention is particularly useful for preparing sample materials for direct analysis in atomic absorption spectrometers, a brief description of this type of spectroscopic analysis is given. A more complete description of atomic absorption spectrometers and their use is contained in United States Patent No. 2,847,899, issued Aug. 19, 1958 to A. Walsh. Briefly, a sample containing at least one metal to be analyzed is made into an atomic vapor; radiation containing at least one spectral line which the metal being investigated absorbs (and emits) is passed through the atomic vapor. The intensity of the radiation at this particular spectral wavelength transmitted through the sample vapor is then measured, which yields directly or indirectly (depending on the additional techniques and elements incorporated in the spectrometer) the amount of absorption at this wavelength by the atomized sample. Since the absorption varies in a well-known mathematical manner with the concentration of the tested-for metallic component in the sample material, this concentration may be readily determined (and in some instruments directly read out). Atomic absorption spectroscopy has been utilized more and more in recent years, especially for determining the presence of relatively small quantities of metals in sample materials.

The typical method for forming the atomic vapor of sample material is to introduce a solution of the substance to be analyzed directly into a relatively hot flame. Where the sample is initially a solid (which may contain the metallic elements to be analyzed either in the form of salts, oxides, alloys or even as free metals), such a technique requires that the entire sample be dissolved so as to form an even solution thereof. In some cases this requires extremely caustic reagents (e.g., concentrated nitric acid), often followed by further treatment (for example, neutralization of the acid). Typically the sample substance is highly diluted in the solution, so that relatively long analyzing times are utilized to maximize the sensitivity of the measurements. Thus a relatively long time of preparation of the sample may be followed by a relatively long analyzing time. Since at least the preparation steps often require the constant attention of a chemist or technician, routine analysis is somewhat more time consuming and expensive than would otherwise be the case. Some especially refractory metals (such as, for example, titanium) exhibit only a relatively low degree of disassociation when introduced along with a relatively large amount of liquid into a flame; this difficulty may be especially troublesome where the tested-for element is originally present in extremely small quantities in the original substance. In certain types of laboratory analysis the total amount of sample material available may be extremely small. Unless an extreme dilution is utilized, the total amount of solution available may be insufficient to run an analysis by the conventional atomic absorption technique.

An object of the invention is the provision of an improved technique for vaporizing and atomizing (i.e., disassociating) sample materials for analytical measurement, especially by atomic absorption spectroscopy.

Another object of the invention is the provision of such a technique which requires minimum preparation of the sample or other time-consuming operations, which additionally allows the actual atomic absorption measurements to be made within a shorter time.

A further object of the invention is to provide a technique for vaporizing a sample, which technique is particularly useful with small sample quantities.

A still further object of the invention is the provision of a technique for vaporizing samples, which although useful for both liquid and solid samples, is particularly adaptable to the direct vaporization of solid sample materials.

Other objects, advantages and features of the invention will be obvious to one skilled in the art upon reading the following detailed description of specific examples of the invention.

The invention may utilize a low explosive (of the type used to propel bullets and the like, therefore often called "propellants"), to which a small-to-moderate amount of sample material has been added. Because the low explosive is unconfined during the combustion, there is no great local gaseous pressure built up (characteristic of a true explosion), the burning being similar to that of a fast fuse. The low explosives utilized may be of the type known as "double base" powders (which may comprise as the two bases, for example, nitrocellulose and nitroglycerin, plus a stabilizer such a diethyldiphenylurea or "centralite").

Commercially available double based propellant powders are suitable for this purpose, as will appear in the specific examples hereinafter given. If the sample is initially a solid, granular material, it may be directly admixed with the propellant powder. If the sample grains are quite large, or the sample is in the form of a single solid block, it may be mechanically ground to a powder having suitable size grains (for example in a mortar and pestle), before being so mixed. Typically the quantity of sample material added to the propellant powder will be about 10% of the total mixture by weight. If the tested-for element is present in the sample material in relatively high concentration (i.e., well over 100 parts per million), even smaller amounts of sample material may be added to the propellant powder. Where the tested-for element is present in the original sample in relatively low concentration (i.e., below 100 p.p.m.), up to about 15% by weight of sample material may be used without any substantial adverse effects in the burning properties of the mixture (at least with the double base powders used in the specific examples hereinafter mentioned).

If the sample is initially a liquid (or is not readily transformed into a suitable powder), the liquid sample (or a suitable solution or suspension of a nonliquid sample) may be directly poured onto the propellant powder in a suitable vessel so as to wet it substantially completely. For liquid samples (or prepared solutions) containing relatively high concentrations of the tested element (i.e., well over 10 p.p.m.), the proportion of as little as one-half cubic centimeter of solution per each two grams of propellant powder (this being the typical amount of powder used in a single analysis) may be used. Use of substantially less solution than this makes even distribution of the sample material throughout the powder extremely difficult. For larger atomic absorption signals or where the tested-for element is present in the liquid sample (or solution) at relatively low concentrations (i.e., about 10 p.p.m. or less), substantially larger proportions of liquid may be added to the propellant powder. One limiting factor in this quantity is that analogous to the above-mentioned limitation with solid samples, namely, that the total amount of added solid material should not exceed about 15% of the combined sample plus propellant powder (after the mixture has dried). For example if the total amount of solids in the liquid sample is 10%, no more than about 3 cc.'s of liquid sample should be added per two grams of propellant powder. Even where the total amount of solids present in the liquid sample is relatively low, the amount of liquid sample (or solution) which may be added to the propellant powder is limited by the practical consideration that the drying time may become excessive. The necessary drying may be accelerated by using conventional drying techniques, including moderate heating (double base propellant powders of the type herein disclosed being quite safe up to temperatures of about 100° C.). Thus although there is no theoretical upper limit, the total amount of solution added will usually be about one or two cc. per two grams of propellant powder (depending on the total amount of solid present in the liquid sample).

Liquid samples (or solutions) may also be converted to a solid form by using an inert powder to absorb the liquid. The inert powder is preferably chemically pure at least as to the elements for which tests are likely to be run, as well as to elements which may interfere with those to be analyzed. Alternatively the inert powders may be chemically analyzed and the known amount of impurities subtracted from the atomic absorption results; or more preferably "blank" atomic absorption runs may be made with only the inert powder and the propellant powder present, from which zero calibration curves may be determined. Examples of suitable inert powders include analytical quality pumice, kieselguhr (i.e., porous diatomaceous earth), and the like. This techinque is particularly useful for preparing "standard" powders for calibration purposes from readily available standard solutions. In this technique, the combined liquid sample solution and inert powder are fully dried before being added to the propellant powder. An example of each of the three different types of sample vaporization (namely, of solid sample, liquid or solution sample, and liquid plus inert powder) follows.

EXAMPLE I

For the purpose of performing a controlled analysis, a test "sample" of the National Bureau of Standards Opal Glass Powder, N.B.S. No. 91 was utilized. This material is known to contain .097% lead oxide (PbO), so as to be .090% (or 900 p.p.m.) lead by weight. Relatively small quantities of this Standard Opal Glass Powder were mixed with much larger quantities of a commercially available propellant powder, namely, "Hercules" smokeless rifle powder "2400" manufactured by Hercules Powder Company. Mixtures of this propellant powder (hereinafter referred to as "2400 powder") were made containing 0.3%, 0.5%, and 1% of the Standard Opal Glass Powder (by weight). Small quantities of each of these mixtures were then analyzed by atomic absorption spectroscopy in the following manner.

After complete mixing, approximately two grams of each sample mixture was spread upon a clean glass plate so as to form a very thin (approximately 1 millimeter) layer in a rectangular area, 7¼ inches long and ¾ of an inch wide. The particular dimensions of the rectangle were chosen so as to most efficiently match the radiation beam path in the particular atomic absorption spectrometer utilized (namely a Model 303 Atomic Absorption Spectrophotometer, manufactured by The Perkin-Elmer Corporation). A rectangular template (open at the top and bottom and having sides forming at its interior a rectangle of the desired size and shape) may be first placed on the plate and then the sample mixture added to facilitate forming an even layer of the desired rectangular shape.

The powder is preferably evenly spread, for example, by sprinkling it onto a plate at a moderate height from a small spoon. This sprinkling may be done while the glass plate is resting on a small vibrating stand to cause the powder (which in these cases comprises an overwhelming majority of propellant powder grains) to settle into an even layer. The template is then removed in the vertical direction, leaving the desired rectangular area of the glass plate covered evenly with the sample mixture. The plate is then positioned just below the radiation beam in the sample compartment of the spectrophotometer (i.e., more or less in the same position as the head of a conventional atomizer type of burner, which is of course removed since it is not used with this method).

The atomic absorption spectrometer is put into normal operating condition (using a lead hollow cathode lamp or other source of "lead" spectral line radiation), including the setting of the wavelength drive to the desired resonance line (2833 A. in our case). After the recorder of the instrument has been started, the sample and propellant powder mixture is ignited (a conventional match being sufficient), the instrument readout therefore giving a direct absorbance reading in a conventional manner. Higher detector signals may be obtained if the flame length along the radiation beam is increased. This may be accomplished by igniting the center of the "trail" of sample and propellant powder mixture. The flame thus burns in both directions, eventually becoming a pair of flames each advancing toward the different ends. Alternatively both ends of the trail may be ignited more or less simultaneously (simply by holding a match in each hand and igniting both ends at more or less the same time). When the center (or both ends) is so ignited, the combustion progresses relatively evenly toward (or away from) both ends, taking approximately 10 seconds to consume a trail of the particular dimensions mentioned. Obviously physically longer powder trails will burn for longer periods of time. Similarly the powder may be ignited at a larger number of points (which may be particularly useful with long trails). If the atomic absorption spectrometer has variable "noise suppression" the time constant introduced thereby should not substantially exceed the burning time of the trail. For example, in the particular commercially available instrument previously mentioned zero noise suppression or preferably the moderate noise suppression settings of "1" or "2" (having time constants of approximately 1½ and 4 seconds respectively) were found to be perfectly satisfactory.

In addition to the 3, 5 and 10 p.p.m. lead sample mixtures, a measurement was made of the pure "2400" propellant powder. From the raw absorbance data obtained, it was determined by the method of "additions" that the "2400" propellant powder contained (or at least gave readings indicating that it contained) 1.7 p.p.m. lead. Adding this lead contribution of the propellant powder to the intentionally included lead from the Standard Opal Glass Powder indicated that the prepared sample mixtures actually contained 4.7, 6.7, and 11.7 p.p.m. of lead. So considered, the data obtained by averaging two runs of each of these sample mixtures fell along a smooth curve when absorbance was graphed against lead in parts per million. Specific average absorbance measurements (after a small adjustment for scattered light) obtained were: 0.065 for the pure propellant powder (1.7 p.p.m. lead); 0.156 absorbance for the 4.7 p.p.m. lead sample; 0.221 absorbance for the 6.7; and 0.319 absorbance for 11.7 p.p.m. lead. The apparent sensitivity is 0.13 p.p.m. lead (i.e., this is the amount corresponding to 1% absorption).

A somewhat similar analysis was performed, in which the tested-for element was copper, by making up samples containing copper oxide (CuO). In this case the copper oxide was first "cut" by mixing a small amount of copper oxide with a large amount of pure talcum powder so as to form a one part per thousand copper oxide in talcum mixture (by weight). Such a copper oxide-talcum powder (or other inert powder) mixture is convenient, in that it facilitates making up test samples of moderate concentrations. For example, if one part of this copper-talcum mixture is added to 19 parts (by weight) of the propellant powder (i.e., a 5% by weight mixture), the final sample mixture will contain 50 p.p.m. of copper oxide, or 40 p.p.m. copper. Such premixing or cutting avoids the necessity for weighing and attempting to mix an extremely small quantity of pure copper oxide (or other material containing an extremely high concentration of the tested-for element) with a relatively huge amount of propellant powder. When such premixing is utilized, the "zero" test sample run for calibration purposes should contain essentially the same amount of talcum powder (or other diluent) as will the actual sample (so as to compensate for both any changes in the combustion characteristics of the propellant powder and any light scattering caused by the talcum powder during the burning as well as for any significant quantities of the tested-for elements in the "pure" talcum powder itself).

As generally stated earlier, the original solid sample material may be ground in a mortar and pestle or physically changed in other ways to make it more suitable for admixing to the propellant powder, either directly or along with other inert powders (as in the copper oxide example just given). By running a series of analyses of different concentration known samples, a "working" or calibration curve of absorbance versus the amount (in, say, p.p.m.) of the tested-for element may be drawn. Such a working curve may then be used to read directly the concentration of an unknown sample once its absorbance has been determined. As noted earlier, the actual test run and the various calibration runs should be made under similar conditions; for example, if inert material is present, it should be at least similar in composition, physical condition (e.g., size of granules), and concentration in the calibration samples to that which will be present in the actual test samples. Such calibration working curves are, of course, often used in atomic absorption spectroscopy, and are equally useful in the following as well as preceding examples.

EXAMPLE II

Dissolved solid sample

Sample mixture containing 2, 4, 8 and 20 p.p.m. copper were made up from copper solutions and the same aforementioned Hercules "2400" propellant powder. The lowest concentration (2 p.p.m. copper) mixture was made by adding 2 cc. of a 5 p.p.m. copper solution to five grams of "2400" powder. Upon drying, the mixture contains ten micrograms of copper evenly distributed through the propellant powder. This dried test sample mixture may then be used in exactly the same manner as that described above in Example I. The proportion of approximately 2 cc. of solution per five grams of powder appears to be optimum. If much smaller amounts of liquid are used, both good wetting of the propellant powder and even distribution of the sample therethrough become extremely difficult (about 1 cc. per 5 grams of propellant powder appears to be the lower practical limit). Liquid quantities much larger than 2 cc. per 5 grams of propellant powder increase the drying time unnecessarily; but obviously moderately larger amounts of the solution may be used, especially if time is not critical and/or auxiliary drying equipment is available. Thus to make a 4 p.p.m. copper sample mixture one may use 4 cc. of a 5 p.p.m. copper solution per 5 grams of propellant powder, but it is preferable to use 2 cc. of a 10 p.p.m. copper solution instead. Similarly 2 cc. of a 20 p.p.m. copper solution added to 5 grams of propellant powder is definitely preferable to 8 cc. of 5 p.p.m. solution to make the 8 p.p.m. final sample mixture. A 20 p.p.m. final test sample mixture may be made by adding 2 cc. of a 50 p.p.m. copper solution to 5 grams of propellant powder, and so on. After drying, each 5-gram final test mixture provides sufficient powder to run two tests as in Example I above. Independent analysis of the pure "2400" propellant powder determined that it contained 5 p.p.m. of copper. For this reason the samples actually contained 7, 9, 13, and 25 p.p.m. total copper; the resulting data was compatible with these actual values.

A different technique for determining the true "zero" calibration line for the atomic absorption analysis of the tested-for material may be used instead of independent analysis of the propellant powder (and any other materials admixed with the sample). This consists in running an atomic absorption test for an element known to be absent in the various sample materials, and using the obtained "absorbance" data as the reference or zero line. For example where, as in the above example, copper is the tested-for element, a calibration analysis for silver may be used. Since silver has an analytically useful spectral line at 328 mµ (as compared to 325 mµ for copper), analysis at this closely adjacent wavelength will not cause any substantial change in the various instrument parameters (except of course for those of the silver lamp instead of the copper lamp). When pure "2400" propellant powder was burned, the resulting average measurement was 0.011 absorbance units as compared to an average value of around 0.250 for the 5 p.p.m. copper test sample mixture. Thus the amount of radiation scattered from the radiant beam path by the burning materials is quite low compared to the amount absorbed by even small quantities of the actual substance tested for. In this specific example, the amount of scattered light is well below the amount of light that would be absorbed by less than one p.p.m. of copper (when a copper lamp is used).

The observed average absorbance measurements for the above copper samples (including the 5 p.p.m. copper in the propellant powder) were as follows: .253 absorbance value for the 5 p.p.m. total copper; .374 absorbance for the 7 p.p.m. copper; .488 absorbance value for 9 p.p.m.; .587 for 13 p.p.m.; and .846 absorbance for 25 p.p.m. total copper. When graphed on linear paper, these average values make a smooth curve which passes substantially through the origin. Each of the just mentioned absorbance values has been adjusted by subtracting .011 absorbance from the measured values to compensate for the known amount of scatter. As just noted the effect of scatter is quite small even for the lowest value of copper concentration. The precision (reproducibility) of the above results was sufficiently good (a few percent) to indicate that the technique provides reasonably reliable results. Once a "working" (calibration) curve has been established, test samples may be analyzed; and the concentrations read from the working curve for the absorbance determined should be quite close to the actual amount of tested-for sample element, as long as the calibration runs and actual test runs are performed under similar conditions, as previously noted.

EXAMPLE III

Liquid sample

A sample of blood serum was diluted one-to-one with distilled water and thoroughly mixed. Two cc. of this mixture was then used to wet 5 grams of the same "2400" propellant powder. After drying, 2½ gram portions of this mixture were ignited in essentially the same manner as given in Example II above. As a comparison, a similar sample mixture was made by adding 1 p.p.m. copper (namely, by diluting 1 cc. of the blood serum with one cc. of 5 p.p.m. copper solution, rather than distilled water as above). This copper-enriched mixture was then added to 5 grams of "2400" powder and dried. The test results indicated that the first (unenriched serum sample) contained 7.4 p.p.m. and the enriched (i.e., 1 p.p.m. copper added) serum sample contained 8.1 p.p.m. Since 5 p.p.m. copper are contributed by the impurities in the propellant powder, the results indicate 2.4 and 3.1 p.p.m. in the samples themselves. Since the value for normal blood should be approximately 1 p.p.m. (and the enriched sample 2 p.p.m.), it appeared that the serum was affecting the burning characteristics of the powder (this effect being visually observable). To determine this, a sample of egg albumin was admixed with distilled water so as to form a solution having substantially the same concentration as the similar proteins in the one-to-one diluted blood serum. Two cc. of this "blank" were then applied to 5 grams of "2400" powder and dried. Standards of "2400" powder containing respectively 2 p.p.m. and 4 p.p.m. copper were then prepared (as described previously) using this albumin-containing solution as carrier. When the blood serum plus "2400" powder atomic absorption spectroscopy data was compared to these standards the blood serum was found to contain 1.2 p.p.m. of copper, which is in reasonable accord with the amounts of copper found in human blood serum by conventional means.

If calibration against a blank albumin solution is utilized as suggested above, there is no need to dilute the blood serum (which contains approximately 10% solids by weight). Rather 2 cc. of the blood serum may be directly added to 5 grams of propellant powder, dried, preferably reground in a mortar and pestle if necessary, and then used directly for the atomic absorption analysis as explained above. The added solids in 2 cc. of blood serum contribute only about 0.2 gram of additional powder to the 5 grams of "2400" propellant powder, thereby being well below the percentage which could adversely affect the burning thereof.

Optional compressing

The above specific examples illustrate the use of the invention in its simplest form, in which the mixture of sample and low explosive (plus inert material, in some cases) are ignited directly (after drying, if necessary) in the form of a powder "trail" (i.e., an extremely low, fairly long and moderately wide uniform pile of powder). As previously noted, typical burning time may be about 10 seconds for an effectively two-point ignition of a specific typical such trail (matched in length and width to a particular atomic absorption spectrometer). The burning time may be increased by more tightly compacting the powder. Such compression also increases the intimacy of contact between the sample substance and the propellant powder (especially when the sample during the mixing step was itself in powder form), and increases somewhat the temperature reached within the burning volume.

Compacting or compressing of the mixture increases the burning time by reducing the effective area of the flame front and thereby reducing the accessibility of the other parts of the material to this front as the latter advances generally parallelly to itself when properly ignited. The compacting of the heat-emitting material also concentrates the thermal energy, as well as reducing heat dissipation in general by reducing the effective surface of the burning volume. The more intimate contact of (powdered) sample and propellant additionally contributes to somewhat more efficient transfer of thermal energy to the actual sample substance. All of these factors lead to a somewhat slower, more uniform reaction in which the sample material receives a great amount of thermal energy. Thus both the available analytical time and the intensity of the activation of the sample are increased, yielding even more favorable conditions for atomic absorption spectroscopy.

This additional advantageous step of compacting the sample and propellant powder mixture may be used in any one of the three examples. In particular, after the mixture is formed by any one of the previously described techniques (and subsequent to the drying step if required), an appropriate quantity thereof is placed in a die press. Substantial pressure is built up within the press (2,000 to 3,000 lbs. per square inch having been found to yield good results), so that a well-compacted pellet is formed. The press may be designed to form a generally wafer-shaped pellet similar in shape and at least broadly similar in size to the available "sample" space of the atomic absorption spectrometer with which it is intended to be used. For example, a single (thin) flat oblong pellet of about four inches in length, half an inch in width, and a "height" (or thickness) of about 2 mm. could be made from a few grams of mixture for use with the above-mentioned Model 303 Perkin-Elmer instrument. Obviously single pellets or wafers (of different size and/or shape) may be made for use with other spectrometers. If a single such pellet is utilized, it will typically contain about five grams of mixture, for wafers of a size in the neighborhood of the exemplary one.

Rather than forming a single such wafer, a plurality of smaller pellets may be formed. Typically such smaller pellets will still be of similar (very small) thickness or height as the full sized ones, but may be of any lesser size and shape (including round) in the other two dimensions (length and width). For example four pellets of about 1 inch by ½ inch and 2–3 mm. thickness may be laid end to end to approximate one of the above-mentioned exemplary longer pellets. Since round pellets (i.e., those in the shape of a flat disc) are readily formed in conventional small presses, a plurality of these may be used to closely approximate almost any desired shape. For example, about six linearly arranged such thin cylinders of approximately ½ inch diameter would reasonably fill the radiation beam area of the previously mentioned exemplary atomic absorption spectrometer.

A linear array of 2 to 3 such disc-shaped pellets of approximately ½ inch diameter, formed under die pressure of between 2,000 and 3,000 pounds per square inch, have actually been utilized in experiments. As expected, the burning time for such compressed form is appreciably greater than (approximately twice) that of a similar amount of mixture in the loosely piled state of the foregoing three examples. In addition the practical sensitivity of the atomic absorption analysis was in fact substantially higher than with loose powder, apparently because of more intimate contact of sample and propellant powder and the somewhat greater temperature reached within the pellets, as previously mentioned. Smaller quantities of mixture and especially propellant powder in such pellet form thus may be used in a given analysis.

It has also been found, as could be expected, that a plurality of smaller pellets actually give a higher analytical sensitivity than a single pellet (of substantially the same composition, compression and total material). This is of course caused by the longer path of absorbing atomized element interrupting the radiation. Igniting of a long single pellet at a plurality of points would duplicate this effect of separate, smaller pellets. However, since smaller pellets are easier to form and more readily adaptable to different analyses (and different analytical instruments) there appears to be a practical advantage in using a plurality of such smaller pellets in general. The above technique of compressing the mixture into pellets may be used in conjunction with any of the previously described techniques, and is especially advantageous for increasing the sensitivity of the atomic absorption analysis.

Alternatives

The three examples given above, with or without subsequent compressing to a pellet, illustrate rather diverse versions of the inventive technique, which is characterized by the adding of the material to be tested to a low explosive (propellant) powder, and the ignition thereof under atomic absorption analysis conditions. All of the previously mentioned specific examples utilize the same commercially available propellant powder, which was used primarily because of its ready availability, moderate burning rate, and reasonably high heat-releasing potential and burning temperature. The manufacture's specifications for these latter two quantities are a heat potential of 1,080 calories per gram and an explosive temperature of 3,301° K. when the "2400" powder is confined (as it normally would be in use as a propellant or low explosive); when burned in the open as in the previously described techniques, the released heat and the combustion temperature are both somewhat lower.

Another propellant powder of the same manufacturer was also successfully tried. This powder is sold by the Hercules Powder Company under the trade name of "Bullseye" Pistol Powder, having a heat potential of 1,306 calories per gram and an explosive temperature of 3,807° K. when confined. The greater heat potential and temperature of this propellant powder suggests its use with more refractory sample materials; and in fact successful titanium atomic absorption analyses were performed using this "Bullseye" propellant powder. The advantage of the higher heat potential and operating temperatures of this "Bullseye" powder over the "2400" one is somewhat offset by the disadvantage that the same size "trail" of "Bullseye" powder will burn in only about one-half of the time of the ten seconds taken by the "2400" powder (with two flames burning). Thus, the "Bullseye" propellant powder is preferable to the "2400" powder where the higher temperature is the most significant factor (e.g., with extremely refractory sample material). The preferability of one of these propellant powders relative to the other will also be affected by other factors, such as the size and shape of the available sample area in a particular spectroscopic instrument (which, in turn, determines the available sampling times for each different burning rate). Therefore either of these two powders (or others) may be more suitable for a particular analysis with a specific instrument.

Another characteristic of a propellant powder, affecting its suitabality for a particular analysis (which has been briefly touched upon above) is the amount of the tested-for material that the powder itself may contain. Thus the above referred to "2400" propellant powder was found to contain extremely large amounts of magnesium, rendering it essentially unsuitable for use in atomic absorption analysis of this element. On the other hand, its above-noted purity as regards silver would be an advantage in analysis of this element. Thus the spectroscopist may find that one commercially available propellant powder is preferable for one particular element analysis, while another powder may be more suitable for analysis of even the same sample material for a different element.

The diversity of materials and sample states which may be tested by the inventive technique is deemed obvious to one skilled in the art from the above different examples. However since the inventive technique allows rapid and simple sample preparation, it may not be obvious that the field of atomic absorption spectroscopy is thus broadened to include many applications not now commonly accomplished thereby. For example, samples of ore, believed to contain significant quantities of a sought-for metal, may be analyzed by the inventive technique in an extemely short time. The ore sample would first be ground (if necessary) by any conventional means, and a known quantity (for example, about 0.1 gram) would then be admixed with about 2 grams of suitable propellant powder. The resulting mixture may then be directly analyzed (as explained in Example I above) in a matter of seconds. Comparative analysis of a similar ore but with a known (or zero) amount of the sought-for metal may be used for a more accurate determination of the amount of small quantities of the sought-for metal (for example, gold). Indeed the invention makes atomic absorption spectroscopy practically useful for almost any analysis for metallic substances, from the most routine repetitive tests to the most difficult laboratory analysis, because of the elimination of time-consuming and sometimes extremely difficult sample preparation techniques previously necessary.

Therefore the invention is believed to be a basic advance in the atomic absorption spectroscopic art, and for that reason it is not deemed to be limited to any of the details of the various specific examples described. Thus, the particular named commercially available propellant powders are purely exemplary and not limiting. In fact, not only may various other propellant and other low explosive powders be used instead, but other pyrophoric mixtures (besides low explosives in general). Thus, different relatively high thermal energy producers, such as "Thermit" powder for example, may be employed. Similarly, the invention is not limited to any of the specifics of the preceding description; rather it is defined by the scope of the appended claims.

What is claimed is:

1. In an atomic absorption spectroscopic analysis of the type in which a radiant energy beam, including a discrete wavelength at which an element of interest absorbs energy in its atomic state, is passed through a sample material in an atomized state, and the absorbed energy within a spectral band including said discrete wavelength is detected as a measure of the amount of said element of interest present, the improvement comprising:
   mixing an original sample material with a substantial quantity of a pyrophoric substance;
   placing the resulting sample pyrophoric substance mixture directly under the path of said radiant energy beam;
   igniting said mixture so as to cause the resulting flame, including atomized particles of said element of interest, to be traversed by said radiant beam,
   and determining the amount of radiation at said discrete wavelength absorbed by said flame while said mixture is burning.

2. The atomic absorption spectroscopic analysis method of claim 1, in which:
   said pyrophoric substance is a low-explosive propellant composition.

3. The atomic absorption spectroscopic analysis method of claim 1, in which:
   said resulting sample-pyrophoric-substance mixture is in the form of a granular powder.

4. The atomic absorption spectroscopic analysis method of claim 3, in which:
   said powdered mixture is spread out as a thin trail of relatively great length and moderate width, so as to conform generally in shape to a substantial length of the radiant energy beam path, directly thereabove.

5. The atomic absorption spectroscopic analysis method of claim 3, in which:
   said resulting sample-pyrophoric-substance mixture is compressed prior to ignition,
   whereby intimate contact between said sample material and said pyrophoric substance in said mixture is assured, and both relatively high internal combustion temperature and relatively long total burning time of said mixture is achieved.

6. The atomic absorption spectroscopic analysis method of claim 5, in which:
   said compressing of said mixture is of the order of about 2,000 pounds per square inch,
   whereby said mixture is formed into a compact, self-supporting solid mass, which may be conveniently handled as a single pellet.

7. The atomic absorption spectroscopic analysis method of claim 1, in which:
   said pyrophoric substance is a granular powder;
   said original sample material is initially a solid, and is mechanically transformed if necessary into a powder having a granularity similar to that of said pyrophoric powder;
   and said mixing comprises direct intermingling of said transformed original sample material and said pyrophoric powder.

8. The atomic absorption spectroscopic analysis method of claim 7, in which:
said original sample material is first admixed with a substantial quantity of an inert diluent powder,
and the sample-diluent powder mixture is then intermingled with said pyrophoric powder to form a final sample-diluent-pyrophoric powder mixture,
whereby a final mixture of moderate element of interest concentration may be prepared from an original sample mixture of high concentration of said element without requiring the even intermingling of very small amounts of sample material with disproportionately much larger amounts of propellant powder.

9. The atomic absorption spectroscopic analysis method of claim 1, in which:
said pyrophoric substance is a solid;
said original sample material comprises a liquid;
said sample-containing liquid is added directly to said pyrophoric solid;
and the resulting liquid-solid mixture is dried to a solid prior to said igniting step.

10. The atomic absorption spectroscopic analysis method of claim 9, in which:
said resulting mixture, after drying, is ground into a granular powder,
and said granular powder is then spread to form said relatively thin trail.

11. The atomic absorption spectroscopic analysis method of claim 1, in which:
said pyrophoric substance is a solid;
said sample material, in the form of a liquid, is mixed with a solid inert material;
the resulting liquid-solid mixture is dried to a solid;
and said solid mixture is then mixed with said solid pyrophoric substance prior to said igniting step.

No references cited.

RALPH G. NILSON, *Primary Examiner.*

S. C. SHEAR, *Assistant Examiner.*

U.S. Cl. X.R.

88—14